INVENTOR.
ELVIN D. SIMSHAUSER
BY Morris A. Rabkin
ATTORNEY

INVENTOR.
ELVIN D. SIMSHAUSER
BY Morris&Rabkin
ATTORNEY

United States Patent Office

3,249,923

Patented May 3, 1966

3,249,923

INFORMATION HANDLING APPARATUS

Elvin D. Simshauser, Merchantville, N.J., assignor to Radio Corporation of America, a corporation of Delaware Filed Dec. 11, 1962, Ser. No. 243,836
12 Claims. (Cl. 340—172.5)

This invention relates to improved magnetic devices for handling and processing information, and also to information processing and handling systems which incorporate such improved magnetic devices.

The devices and systems provided by the invention are especially suitable for handling binary coded digital information. The information may be stored in devices embodying the invention and read out from these devices, either in the same digital code in which the information is stored or in another digital code. A system embodying the invention is especially suitable for use in a printer wherein the system translates characters of digital information into a suitable form for operating a printing device which prints the characters in legible form. A character may either be alpha-numeric or any symbolic designation.

A difficulty in constructing many known magnetic devices is in the wiring of conductors which provide electrical signal coupling to the devices. A typical magnetic device is a matrix of tiny toroidal cores. A maze of wires is usually required to provide coupling of input, output and other signals to the cores.

Another problem in constructing magnetic devices using toroidal cores is the support of these cores in a mechanically sturdy array. The fabrication of magnetic devices is often made more difficult and their cost increased by the need for auxiliary supporting devices and techniques.

It is an object of the present invention to provide improved magnetic devices for handling digital information wherein complex wiring to provide electrical signal coupling to the devices is eliminated so that the devices are easy to fabricate at low cost.

It is a further object of the present invention to provide improved magnetic devices which are physically strong and resistant to shock and vibration and which can be made readily in compact configurations.

It is a still further object of the present invention to provide improved systems, including magnetic devices, storing, translating and otherwise handling digital information.

It is a still further object of the present invention to provide improved systems using magnetic devices for converting or encoding digital information in one digital code into another digital code.

It is a still further object of the present invention to provide improved systems including magnetic devices for encoding digital information presented in one form into another form suitable for operating a printing device.

It is a still further object of the present invention to provide an improved system for translating characters of digital information into signals for driving a matrix printer.

It is a still further object of the present invention to provide an improved signal switching system, including magnetic devices, for selecting any of a plurality of switch paths between a plurality of inputs and outputs in accordance with digital codes.

Briefly described, magnetic devices for handling digital information which embody the invention include magnetic cores having predetermined physical configurations, which configurations provide for magnetic linkage with certain cores but not with others. The devices may each be configured in accordance with a digital code in which information may be expressed for individually storing or otherwise handling different units, such as different characters of the information.

A magnetic device in accordance with an embodiment of the invention, in brief, includes a plurality of magnetic core structures and a plurality of conductors. Each of the core structures defines a closed magnetic flux path. Each core structure includes a plurality of apertures, placed in accordance with a digital code, either inside or outside of the flux path. A conductor passing through an inside core structure aperture magnetically links the core structure having the inside aperture, whereas a conductor which passes through an outside aperture does not link the core structure with the outside aperture. The core structures may be stacked with apertures corresponding to like code elements (for example, binary bits of the same order in series alignment). The stack may be wired readily by passing the conductors separately through these series of aligned apertures. Input, output and read-out signals may be applied to different ones of the conductors so as to store information in and read information out of selected ones of the cores.

A system in accordance with an embodiment of the invention may include a magnetic device of the type above-described having at least one core structure individual to each different character of coded information. The core structures have pluralities of input apertures disposed selectively on the inside and outside of their respective flux paths in a pattern which corresponds to the code for their respective characters. Each core structure may have one or more output apertures which are arranged inside and outside of their flux paths. The output apertures and the input apertures in the same core structure may correspond to the same character of digital information but in accordance with different codes. Each core structure may have another aperture which is referred to herein as an enabling, and output conductors may extend through the output apertures. A conductor connected to a source of an enabling pulse may extend through the enabling aperture. Means are provided for passing signal currents through the input conductors. These currents may be present or absent in accordance with the value of the bits of the digital code for any given character. The apertures are arranged so that at least one current carrying conductor passes through an inside input aperture of each core structure, except that one core structure having a pattern of input apertures corresponding to the given character which is represented by the digital code. Thus, all, except one selected core, are magnetically linked with a current carrying input conductor, and all except that one core are magnetically saturated. When an enabling pulse is applied to the enabling conductor, only the unsaturated core provides magnetic coupling between the enabling conductor and certain of the output conductors on the unsaturated core which pass through inside apertures therein. Output signals are induced only in these certain output conductors and may be applied to a utilization circuit or device. In the event that the output apertures are arranged in accordance with a digital code different from the digital code for the input aperture, the output signals which are derived from the output conductors are encoded or converted into a different digital code from the code of the input signals to represent the same characters. The output signals may be suitable for driving a printing device so as to form legible representations of the character.

The invention itself, both as to its organization and method of operation, as well as additional objects and advantages thereof, will become more readily apparent from a reading of the following description in connection with the accompanying drawings in which.

Figures 1, 2:
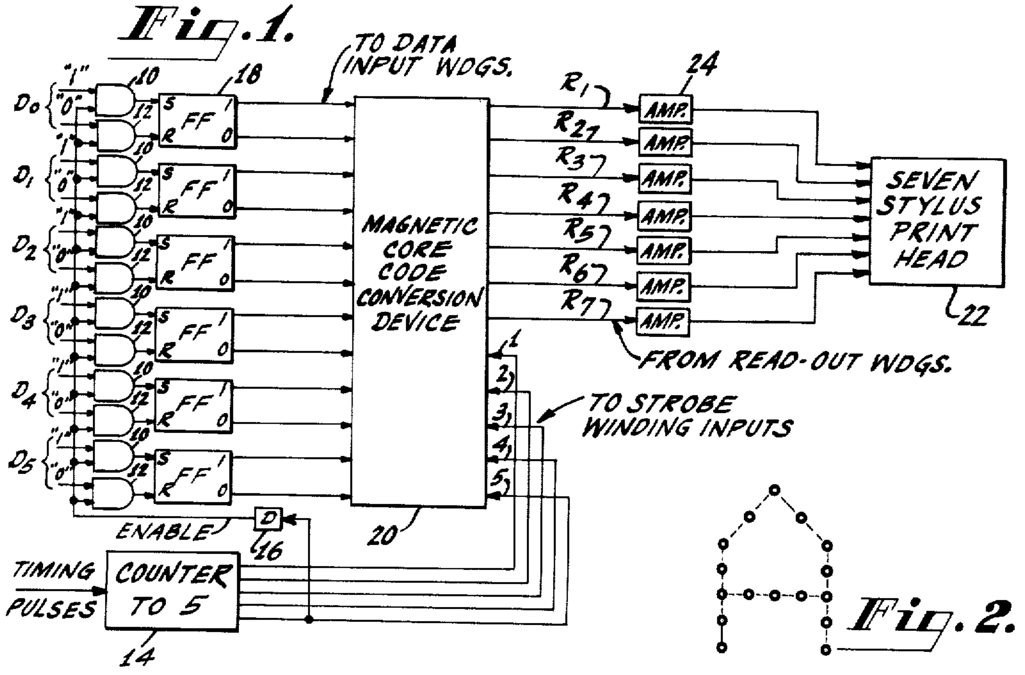
FIG. 1 is a block diagram of a printing system embodying the present invention.
FIG. 2 is a representation of a character which may be formed by means of a printing system shown in FIG. 1.

The input to the printing system shown in FIG. 1 may be the bits $D_0$, $D_1$, $D_2$, $D_3$, $D_4$ and $D_5$ of a multi-bit character of digital information. The bits may be in the form of electrical signal levels or pulses. The bits of each character may be obtained from the output of a computer or other data handling device, substantially simultaneously. The characters may be stored in a register, and may be applied sequentially to the system at spaced intervals of time. A timing pulse may accompany each character.

Two input conductors are provided for each bit. One of these conductors is energized when the bit is a binary "1" bit, and the other conductor is energized when the bit is a binary "0" bit. Two AND gates 10 and 12 are provided for each bit. The "1" bit input conductors are connected to inputs of the gates 10 and the "0" bit input conductors are connected to inputs of the other gates 12. Other inputs to each of the gates 10 and 12 are connected to an enabling line. Enabling signals are generated by a counter 14 which may be a ring counter which provides five equally time spaced output pulses for each timing pulse. Each pulse is provided on a separate output lead. The last or fifth of the counter output pulses enables the gates 10 and 12 after a short delay provided by a delay unit 16 which may be a delay line or resistance-capacitance network.

A plurality of flip-flops 18 are provided, one for each bit of the character of digital information. The AND gates 10 and 12 for each bit are output connected respectively to the set input S and to the reset input R of the respective flip-flops for the various bits. The flip-flops 18 provide temporary storage for the bits of each character when the AND gates 10 and 12 are enabled.

The "1" and "0" outputs of the flip-flops 18 are connected to the data input windings of a magnetic core code conversion device 20 which is described in detail hereinafter in connection with FIGS. 4 and 5. The device 20 encodes the bits of the character of digital information which is stored in the flip-flops 18 into signals $R_1$, $R_2$, $R_3$, $R_4$, $R_5$, $R_6$, and $R_7$, representing the bits of the character according to a code different from the code of the input signals representing the character. The output signals $R_1$ to $R_7$ are obtained from read-out windings in the device 20 and are suitable for operating a printing device, such as a matrix print head 22.

This print head 22 preferably is a seven stylus, electromagnetic print head. Each stylus can print a separate dot of seven dots which form a column of a character. A printing may be done by impacting a carbon paper against a document paper. Other types of matrix print heads may also be used. An electrostatic matrix print head which forms dots by electrostatic discharge, or a magnetic print head which forms dots by deposition of magnetic material may also be driven by the output signals $R_1$ to $R_7$ of the magnetic core conversion device 20. Separate amplifiers 24 may be used to provide printing currents which operate the print head 22.

The magnetic core conversion device 20 also distributes the output signals in time sequence so that successive sequences of the signals $R_1$ to $R_7$ may be provided to drive the print head to print the successive columns of dots which form the character. To this end, strobe or enabling pulses are applied to strobe winding inputs of the device 20 from the output of the counter 14. Five strobe pulses are applied in time sequence to the strobe winding inputs (1), (2), (3), (4) and (5) from the counter 14 over the five separate output leads from the counter.

By way of example, the character "A," as formed by the system of FIG. 1, is shown in FIG. 2. Five columns of dots make up the character. Each column, from left to right, corresponds to a successive strobe winding input (1), (2), (3), (4) and (5), respectively, from the counter 14. The seven dots which make up the columns of the character correspond, from top to bottom, to the signals $R_1$ to $R_7$, respectively, from the read-out windings of the magnetic core code conversion device 20.

Figure 3:
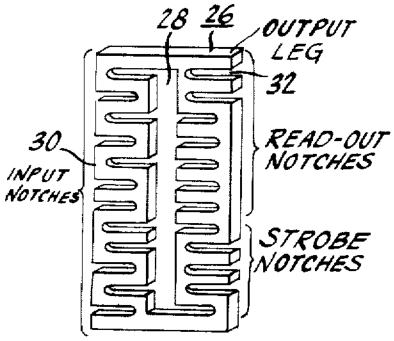
FIG. 3 is a perspective view of a magnetic core structure of a magnetic device embodying the invention.

The magnetic core conversion device 20 includes a plurality of magnetic core structures of the type illustrated in FIG. 3. Each core structure is a lamination 26 of magnetic material. A suitable magnetic material is a nickel-iron alloy, such as an alloy containing approximately 47% nickel and the rest iron. A material sold by the Carpenter Steel Co., of Reading, Pennsylvania under their trade name, "Square u 40" may be suitable. The lamination 26 may be relatively thin (e.g., 6 mils) and is generally rectangular in shape. The lamination has a rectangular, central opening 28 and defines a closed magnetic flux path or magnetic circuit around the opening 28.

The lamination has a plurality of apertures in the form of notches which extend inwardly from the inner periphery or from the outer periphery of the lamination. Accordingly, the apertures are disposed either on the inside or on the outside of the flux path defined by the lamination 26. The notches may be disposed in different patterns, the pattern of inside and outside notches shown in FIG. 3 being for purposes of example only.

One leg of the lamination 26, designated as the input leg 30, has a plurality of input notches therein. A different pair of notches is provided for each of the six bits, $D_0$ to $D_5$, of the character. The other leg of the lamination 26 is designated as the output leg 32. This leg has one group of notches designated as read-out notches. A different one of these read-out notches is provided for each of the output signals $R_1$ to $R_7$. The output leg 32 also has another group of notches designated as strobe notches. Five strobe notches are provided, a different one for each of the five strobe inputs, (1) to (5), which are applied to the magnetic core code conversion device 20 from the counter 14 (FIG. 1).

The notches in the lamination 26 provide paths for individual conductors or windings which are selectively magnetically linked with the lamination depending upon whether or not the notches open inwardly into the central opening 28 and are on the inside of the flux path or open outwardly into the air space surrounding the rim of the lamination and are on the outside of the flux path. For a conductor passing through an inwardly opening notch, the lamination 26 presents a closed, low reluctance flux path around aperture 28 to the magnetic flux which is generated around the conductor by current flowing therethrough. However, the flux generated around the conductor passing through an outwardly opening notch does not see a closed, low reluctance magnetic circuit within the lamination, since part of the magnetic flux path around an outwardly open notch is through the surrounding air space and flux generated by a conductor threading an outwardly opening notch flows around the notch.

The physical configuration of the lamination 26 determines whether signals carried on a conductor are magnetically linked with the lamination 26. Thus, storage in selected ones of a plurality of the laminations 26 depends upon the physical configuration of the laminations, rather than upon complex wiring techniques. The physical configuration of the lamination 26 in the form of notches selectively placed inside and outside of the flux path in the lamination may be used to selectively provide for magnetic linkage with the lamination, when a predetermined combination of signals is applied to conductors passing individually through the notches.

Selection may be on the basis (1) that the lamination is magnetically linked only by signals in accordance with a predetermined code combination (for example, a code combination for a selected character). Another basis (2) for selection may be that the lamination is not magnetically linked for the predetermined code combination which represents the selected character and is magnetically linked for all other code combinations.

In the second case (2), the selected lamination may remain unsaturated, whereas in the first case (1), the selected lamination is driven to saturation. In the herein described embodiments of the invention, the ones of a plurality of laminations which are selected remain unsaturated. Signals applied to conductors through inwardly opening ones of the strobe notches may be induced by transformer action into output signals in conductors which pass through inwardly opening ones of the read-out notches.

When the lamination is saturated to store a character of information, it may be read out by resetting the lamination to an unsaturated state or to an opposite state of saturation from that in which the core is set. Pulses applied to conductors passing through the strobe notches may be operative to reset the core. Output signals may be derived from conductors passing through selected read-out notches.

A plurality of read-out notches, such as the seven read-out notches on the lamination 26 in FIG. 3, may be provided. Read-out conductors may be passed separately through these notches to derive a plurality of output signals. The lamination is magnetically linked only to those conductors which pass through inwardly opening notches. Thus, a predetermined combination of output signals may be read out of a lamination by providing a corresponding, predetermined pattern of inwardly and outwardly opening read-out notches, as will be explained hereinafter. Information in accordance with a first digital code may be converted into a second digital code by providing a pattern of input notches corresponding to the first digital code and a pattern of read-out notches corresponding to the second digital code. Thus, when a character according to the first code is applied to the conductors passing through the input notches, that character may be stored in the lamination 26. When the core is read out by application of pulses to the conductors passing through the strobe notches, a combination of output signals may be derived from the conductors passing through the read-out notches. This combination of output signals corresponds to the character according to the second digital code.

Figure 4:
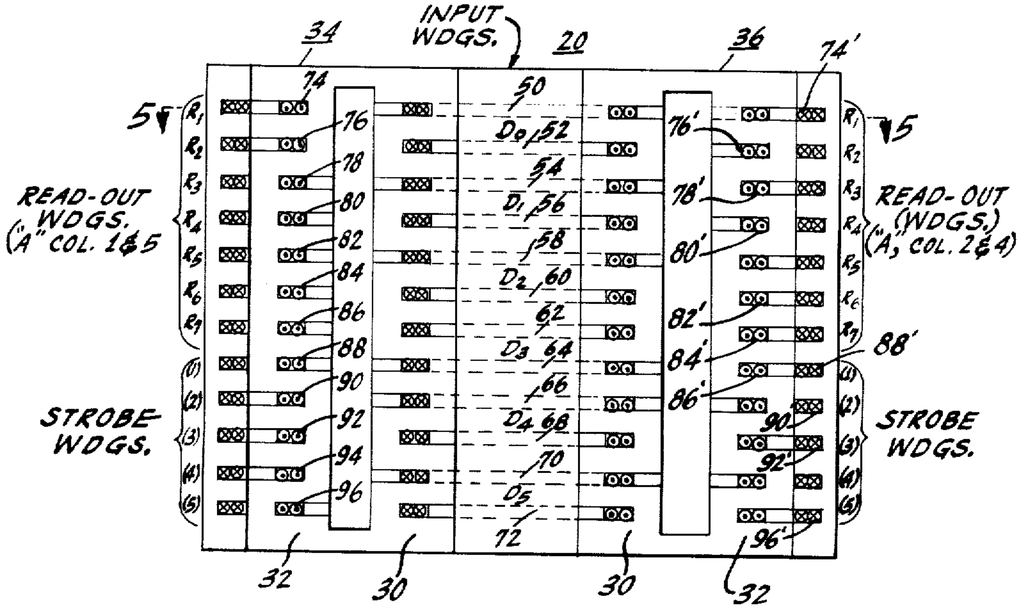
FIG. 4 is a sectional view, taken along the line 4—4 of FIG. 5 and viewed in the direction of the appended arrows, of a code conversion device in accordance with the invention and which may be used in the system of FIG. 1.
Figure 5:
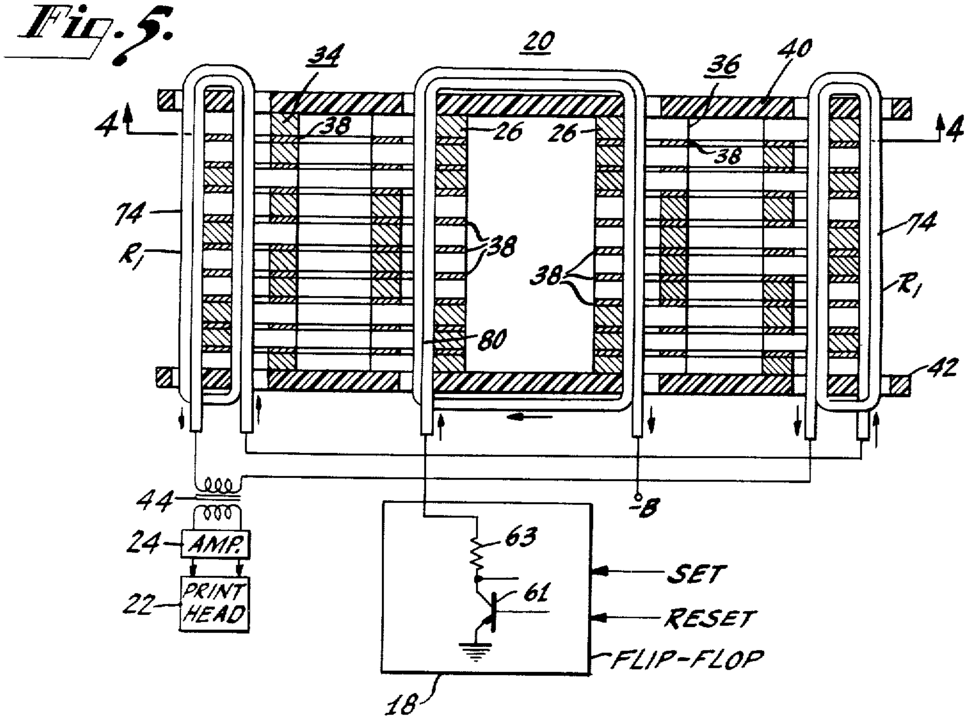
FIG. 5 is a sectional view, taken along the line 5—5 of FIG. 4 and viewed in the direction of the appended arrows, of the device shown in FIG. 4 and also showing circuits for operating the device.

FIGS. 4 and 5 illustrate the use of a plurality of laminations (for example, about 300 laminations) such as the lamination 26 to provide the magnetic code conversion device 20 which converts a vocabulary of characters in accordance with a digital code having a length of six bits, $D_0$ to $D_5$, inclusive, into combinations of output bit signals $R_1$ to $R_7$, inclusive, in accordance with a second digital code suitable for operating a matrix printer.

A plurality of the laminations 26 are arranged in two stacks 34 and 36, as shown in FIGS. 4 and 5 to form the code conversion device 20. Adjacent laminations are separated by magnetic shields 38. These shields may be of conductive material, such as copper, and serve to prevent coupling of signals between adjacent laminations. Only ten laminations are shown in each stack in FIG. 5 to simplify the illustration. The number of laminations depends upon the vocabulary of characters which are to be printed by the system of FIG. 1. Each of the laminations 26 in the stacks 34 and 36 may have different patterns of notches on the inside and outside of their respective flux paths. However, the notches for corresponding input bits, output bits and strobe inputs are in the same relative position. Accordingly, the notches are in series alignment in the stacks 34 and 36. The alignment of the laminations in the stacks is maintained by sandwiching these apertures between two plates 40 and 42 of nonmagnetic material, such as insulating material. These plates also have apertures, corresponding apertures in the plates 40 and 42 and notches in the laminations 26 all being in series alignment with each other.

Suitable fastening means, such as nuts and bolts, may be used to hold the structure in assembled relationship. Alternatively, the structure may, after wiring, be encased by a plastic potting resin. The structure is therefore compact and physically strong.

The magnetic device 20 is wired by passing conductors separately through each series of aligned notches to provide input, output and strobe windings. Several turns of the conductors may be wound to provide sufficient coupling to the laminations or to develop sufficient magneto-motive forces in the laminations to drive selected laminations to saturation.

Each of the stacks 34 and 36 is arranged with the input legs 30 of the laminations facing each other. Thus, the output legs 32 of the laminations 26 in the stacks 34 and 36 are disposed structurally on the outside of the device 20. This arrangement makes it convenient to wind the input windings which are common to the laminations 26 of both the stacks 34 and 36. Two input windings 50 and 52 are provided for the bit $D_0$. Pairs of input windings 54, 56, 58, 60, 62, 64, 66, 68 and 70, 72 are provided for the other bits $D_1$, $D_2$, $D_3$, $D_4$ and $D_5$, respectively. Read-out windings 74, 76, 78, 80, 82, 84 and 86 on the stack 34, and read-out windings 74′, 76′, 78′, 80′, 82′, 84′ and 86′ on the stack 36 provide the output bit signals $R_1$, $R_2$, $R_3$, $R_4$, $R_5$, $R_6$, and $R_7$, respectively. Strobe windings 88, 90, 92, 94 and 96 on the stack 34 and strobe windings 88′, 90′, 92′, 94′ and 96′ on the stack 36 carry the strobe signals (1), (2), (3), (4) and (5).

The sense of the windings through the read-out and strobe notches in the stack 34 is opposite to the sense of the corresponding windings, the read-out and strobe windings, in the other stack 36. Corresponding read-out windings are interconnected in series circuits, as shown in FIG. 5 and described hereinafter. Noise pulses generated in the read-out and strobe windings tend to cancel and buck out in these series circuits, since the senses of the read-out and strobe windings are opposite to each other.

The corresponding read-out windings 74 and 74′, 76 and 76′, 78 and 78′, 80 and 80′, 82 and 82′, 84 and 84′ and 86 and 86′ are connected together in series with the primaries of individual output transformers 44. The secondaries of these output transformers 44 are connected to the inputs of the amplifiers 24 and drive these amplifiers. The amplifiers 24, in turn, drive the electromagnets for actuating different styli of the print head 22. The strobe windings 88 and 88′, 90 and 90′, 92 and 92′, 94 and 94′ and 96 and 96′ are respectively connected together, either in series or in parallel, with the five outputs (1) to (5) of the counter 14. Strobe pulses are applied successively to the strobe windings 88 and 88′, 90 and 90′, 92 and 92′, 94 and 94′, 96 and 96′ for reading out the laminations of the device 20.

The stacks 34 and 36 of the laminations have groups of laminations for each character of the input code, each group including a maximum of five laminations. Some of the laminations of each group may be in one stack 34 and some in the other stack 36. The input legs 30 of the laminations which belong to the same group have the same patterns of inwardly and outwardly opening notches. All of the laminations of a group may be activated when input bit signals $D_0$ to $D_5$ for the character corresponding to that group are applied to the input windings 50, 52, 54, 56, 58, 60, 62, 64, 66, 68, 70 and 72.

Each lamination of the same group may have a different pattern of read-out notches than the other laminations in the group. Different characters may be made up of similar columns of dots. For example, the first and fifth column of the character "A" are identical, as are the second and fourth column of that character (see FIG. 2). Thus less than five laminations may be used in the groups for some of the characters. For example, the character "A" requires only three laminations, one for the first and fifth column, one for the second and fourth column and one for the third or middle column of the "A."

The strobe notches in each lamination of the same group of laminations may each be in a different pattern (for example, a different strobe notch being inwardly opening in different ones of the laminations of the group). However, when the same lamination provides the code for different columns of the character, more than one strobe notch of that lamination may be inwardly opening.

By way of explanation, the operation of the device 20 in providing the output signals which drive the print head 22 to form the first, second, fourth and fifth columns of the character "A" is described herein. The input code for the bits $D_0$ to $D_5$ of the character "A" may be "0" for the $D_0$ bit, "0" for the $D_1$ bit, "0" for the $D_2$ bit, "1" for the $D_3$ bit, "0" for the $D_4$ bit and "0" for the $D_5$ bits. When these bits are applied to the inputs of the AND gates 10 and 12 (FIG. 1) and the enable pulse is supplied to other inputs of these AND gates, all the flip-flops 18 are reset except for the flip-flop 18 which is connected to the AND gates which transmit the $D_3$ bit.

The flip-flops 18 all have the same circuit. A part of the circuit of the flip-flop connected to the AND gates 10 and 12 for the $D_0$ bit is shown in FIG. 5. The flip-flops include two P-N-P transistors 61, one of which provides the "1" output of the flip-flop and the other of which (not shown) provides the "0" flip-flop output. One end of the input winding 50 is connected through a resistor 63 to the collector of the transistor 61 which provides the "1" output of the flip-flop. The opposite end of the winding 50 is connected to a source of operating voltage $-B$ which is returned to ground. The winding 52 is connected between $-B$ and the "0" output transistor of the flip-flop. When the flip-flop 18 is set, the "1" output transistor is conductive and current flows in the direction indicated by the arrows through the winding 50. When the flip-flop is reset the "1" output transistor is cut off and no current flows through the winding 50. The "0" output transistor is, however, conductive in the reset condition of the flip-flop, so that current flows through the other input winding 52 for the $D_0$ bit. All of the notches for the "1" value of the bits $D_0$, $D_1$, $D_2$, $D_4$, and $D_5$ are inwardly opening. However, since all of the flip-flops for these bits $D_0$, $D_1$, $D_2$, $D_4$ and $D_5$ are reset, no magnetic flux is established in the laminations in the group for the character "A" due to the windings 50, 54, 58, 66 and 70 for the "1" value of the bits. Current passes through the windings 52, 56, 60, 68 and 72 which are connected to the "0" outputs of the flip-flops for the $D_0$, $D_1$, $D_2$, $D_4$ and $D_5$ bits. However the latter windings pass through outwardly opening notches. Accordingly, these windings 52, 56, 60, 68, and 72 are not magnetically linked to the laminations for the character "A" and do not magnetically affect these laminations.

The winding 62 for the "1" value of the $D_3$ bit passes through an outwardly opening notch while the winding 64 for the "0" value of that bit passes through an inwardly opening notch. Since the flip-flop for the $D_3$ bit is set, the laminations of the group for the character "A" are also not affected by currents passing through these windings 62 and 64 for the $D_3$ bit. Accordingly, none of the laminations for the character "A" is magnetically affected. However, the pattern of input notch of the laminations for all of the other characters in the stacks 34 and 36 are different from the pattern of character "A." Accordingly, at least one of the windings 50 to 70 which carries a current passes through an inwardly opening notch of these laminations for these other characters. A sufficient magnetomotive force is developed in these other laminations to magnetically saturate them. Accordingly, all laminations except those of the group for the character "A" are saturated, when the input code for the character "A" is applied to the magnetic core conversion device 20. The unsaturated laminations of the device 20 will therefore store the character "A."

A sequence of five strobe pulses is applied successively to the strobe windings 88, 90, 92, 94 and 96, 88', 90', 92', 94' and 96' to read out the device 20. Of these strobe windings, the strobe windings 88 and 96 pass through inwardly opening notches of the laminations for columns one and five of the character "A." The strobe windings 90' and 94' pass through inwardly opening apertures of the lamination for columns two and four of the character "A." All of the other strobe windings pass through outwardly opening notches of the character "A." The read-out windings 78, 80, 82, 84, 86 and 88 in the lamination for columns one and five of the character "A" pass through inwardly opening notches, while the other read-out windings 74 and 76 pass through outwardly opening notches.

When the first strobe pulse (1) is applied to the strobe windings 88 and 88', there is magnetic coupling through the character "A" between the strobe winding 88 and the read-out windings 78, 80, 82, 84, 86 and 88. Output signals for the bits $R_3$ to $R_7$ are respectively induced in the windings 78, 80, 82, 84, 86 and 88. Magnetic induction between the strobe and read-out windings on the lamination for columns two and four of the character "A" does not exist because the strobe winding 88' passes through an outwardly opening notch in the lamination for columns two and four of the "A." No $R_1$ and $R_2$ output bit signals are produced because the windings 74 and 76 pass through outwardly opening notches. The output signals $R_3$ to $R_7$ are amplified in the amplifiers 24 and operate the lower five styli of the seven stylus print head 22 and cause the head 22 to print five dots in the lower five rows of the first column.

When the second strobe pulse (2) is provided by the counter 14, signals are induced between the winding 90' and the read-out windings 76' and 80'. Two output signals $R_2$ and $R_4$ are therefore provided by the windings 76' and 78'. These two signals $R_2$ and $R_4$ drive the second and fourth styli of the print head 22 to print dots in the second and fourth rows of the second column. A lamination (not shown) for the third column is then read out by the third strobe pulse (3), and the dots in the third column are printed. Dots are similarly printed when the lamination for the second and fourth column is read out by the fourth strobe pulse (4). Dots similar to those printed in the first column are printed when the lamination for columns one and five is read out by the fifth strobe pulse.

After a time delay provided by the delay circuit 16, the next succeeding character is applied to the AND gates 10 and 12 and stored in the flip-flops 18. The next character is then stored in the magnetic code conversion device. Noise pulses which are induced into the laminations when the laminations switch from their saturated to their unsaturated states are cancelled in the circuits connecting the read-out windings on the stacks 34 and 36 because these windings have an opposite winding sense.

Figure 6:
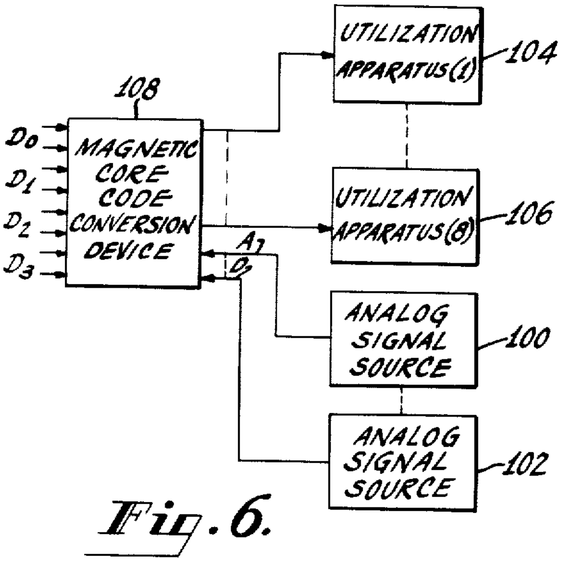
FIG. 6 is a block diagram of a switching system embodying the invention.

Switching of analog signals from any one of a plurality of analog signal sources 100 to 102 to any one of a plurality of utilization apparatus 104 to 106 by means of a magnetic code conversion device 108 shown in FIG. 6. This device 108 may be similar to the device 20 illustrated in FIGS. 4 and 5. A four bit digital code including the bits $D_0$ to $D_3$ may be applied to the device to selectively saturate all but one of the laminations of the device 108. A different one of these laminations is allocated to a different one of four analog signal sources 100 and 102. These analog signal sources are connected to four windings which pass through inwardly opening notches of their respective laminations. Only one inwardly opening notch is provided in each lamination for the signal from the analog signal sources. The four laminations may have different patterns of inwardly and outwardly opening read-out notches. The device 108 may have eight groups of four laminations. Each lamination may have four notches similar to the strobe notches of the lamination shown in FIG. 3.

The analog signal sources 100–102 are separately connected to different windings which pass separately through each of these strobe notches. The laminations of the eight groups may have eight read-out notches. The utilization apparatus 104–106 may be connected separately to windings which pass through different ones of these read-out notches. When a particular combination of the four bits $D_0$ to $D_3$ is stored in the device one of the eight groups of laminations remains unsaturated while the other seven groups are magnetically saturated. Analog signals may therefore be magnetically coupled to the device 78 and outwardly opening notches which are provided in the eight laminations of the group. Switching between different ones of the signal sources 70–72 and different ones of the utilization apparatus 74–76 is in accordance with the combination of bits $D_0$ to $D_3$ of the digital code.

From the foregoing description, it will be apparent that improved magnetic devices and systems have been provided which may be used to perform many information handling and processing operations. Other forms of magnetic core structures and laminations falling within the spirit of this invention will undoubtedly be apparent to those skilled in the art. For example, instead of notches in the laminations, the laminations may have holes therethrough, some inside and some outside of the flux path. The windings may be extended through these holes rather than through the notches as illustrated in the drawings. Other variations and modifications within the scope to the invention will, no doubt, become apparent to those skilled in the art. Therefore, the foregoing description should be taken merely as illustrative and not in any limiting sense.

What is claimed is:

1. A magnetic device comprising a plurality of conductors, and a plurality of cores each intersected by all said conductors, each of said cores having a predetermined physical configuration for magnetic linkage only with selected ones of said conductors.

2. A magnetic device comprising a plurality of core structures, a plurality of conductors each intersecting all of said core structures, said core structures having openings through which said conductors pass for selectively establishing and avoiding magnetic linkage between different ones of said core structures and different ones of said conductors.

3. A magnetic device comprising a plurality of core structures each having a central aperture defining a closed flux path, each of said core structures having a plurality of openings therethrough, certain of said openings extending outwardly from said central aperture and certain others of said openings extending inwardly from the periphery of said core, said certain openings being enclosed and said certain other openings not being enclosed by said flux path, different openings in different ones of said structures being aligned in series with each other, and a plurality of conductors extending separately through said series of said aligned openings.

4. An information handling device comprising a plurality of core structures each having a central aperture defining a closed flux path and each having a plurality of openings, some of said openings extending outwardly from said aperture and being enclosed by said flux path and certain others of said openings extending outwardly from the periphery of said core and not being enclosed by said flux path, different ones of said openings in different ones of said core structures being aligned in series with each other, and a plurality of conductors for carrying electrical signals corresponding to said information, said conductors separately intersecting all of said core structures each through a different series of said aligned openings.

5. A magnetic device comprising a plurality of magnetic core structures of magnetic material each defining a closed loop, each of said core structures having a plurality of apertures, said apertures in different ones of said core structures being aligned in series with each other, some of said aligned apertures opening inwardly and some of said aligned opening outwardly of the loops defined by said core structures, and conductors passing through each series of said aligned apertures and individually magnetically linking only said core structures having inwardly opening apertures through which said conductors pass.

6. A magnetic device comprising a plurality of closed loops of magnetic material each having an inner periphery and an outer periphery, said loops each having the same number of correspondingly spaced notches, certain of said notches in each of said loops extending outwardly from said inner periphery and certain other of said notches extending inwardly from said outer periphery in accordance with predetermined patterns, said loops being disposed in side-by-side relationship with a series of said correspondingly spaced notches in alignment with each other, and conductors individually extending through different ones of said series of said notches.

7. A system for handling characters of digital information comprising (a) a plurality of magnetic core structures each having a central aperture defining a closed magnetic flux path, (b) said core structures each corresponding to different ones of said characters and each having a plurality of apertures, certain of said apertures extending outwardly from said central aperture and others of said apertures extending inwardly from the periphery of said core, said certain apertures being disposed inside said flux path and said other apertures being disposed outside said flux path, (c) input means for passing pluralities of signals each corresponding to different ones of said characters through said apertures of all said structures for selectively magnetically saturating all of said structures except for that one of said structures which corresponds to the same character as one of said pluralities of signals passing therethrough, and (d) output means for reading out signals from said one unsaturated core structure.

8. A system for handling digital information comprising (a) a plurality of core structures each defining a closed flux path, (b) each of said core structures having a plurality of openings therethrough, different combinations of which are either enclosed or not enclosed by said flux path, (c) different openings in different ones of said structures being in series alignment with each other, (d) a plurality of conductors for separately carrying a plurality of input signals extending separately through said series of said aligned openings for magnetically saturating all of said core structures except for those core structures having the ones of said different combinations of openings which correspond to the same digital information as the combination of said plurality of input signals carried by said conductors, (e) each of said core structures having at least another pair of apertures enclosed by said flux path, each of said last-named pair in each of said core structures being aligned separately in series with each other, and (f) conductors extending through said pair for respectively carrying an enabling signal and for deriving an output signal.

9. An information handling system comprising (a) a plurality of core structures each having a central opening defining a closed flux path, (b) each of said core structures having a plurality of apertures therethrough certain extending outwardly from said central opening and certain others extending inwardly from the periphery of the core, said certain apertures disposed inside and said certain other apertures disposed outside of said flux path, different apertures in different ones of said core structures being aligned in series with each other, (c) different combinations of said apertures in different ones of said core structures being on the inside of said flux path, (d) each of said different combinations corresponding to a different character of digital information, (e) input means for providing a plurality of input signals, different combinations of said input signals corresponding to different characters of digital information, said input means including a plurality of conductors extending separately through said series of aligned apertures for carrying different ones of said input signals and for changing the magnetic state of each of said core structures except for that said core structure having the one of said combinations of apertures corresponding to the same character as said combination of signals, and (f) read-out means magnetically coupled to said core structures for deriving output signals therefrom.

10. A code conversion system comprising (a) a plurality of magnetic core structures each having a central opening defining a closed flux path, (b) said core structures each having a first plurality of apertures therethrough on one side of said central opening, different ones of said apertures being on opposite sides of said flux path and satisfying a first code for an individual character of digital information, (c) said core structures each also having a second plurality of apertures therethrough on another side of said central opening of which apertures different ones are on opposite sides of said flux path and satisfy a second code for the same character of digital information as said first plurality of apertures therein, (d) said core structures each also having at least one additional aperture on the inside of said flux path, (e) a plurality of input conductors for carrying a plurality of input signals corresponding to different characters of said information according to said first code extending through said first plurality of apertures of each of said core structures, (f) a conductor for carrying an enabling signal extending through said additional aperture of said core structures, and (g) a plurality of output conductors extending through said second plurality of apertures in each of said core structures.

11. In printing apparatus including a print head having a plurality of styli for writing successive columns of marks to form characters, an encoder for translating digital information representing said characters into signals for operating said print head, said encoder comprising (a) a stack of laminations of magnetic material, each having an opening therein and defining a magnetic flux path around said opening, said stack of laminations including groups, each for a different one of said characters, each of said groups having a plurality of individual ones of said laminations as the members thereof, each said member laminations being provided for a different one of said columns of the character for their lamination group, (b) each of said laminations having a plurality of apertures therein individually arranged either extending outwardly from said opening or inwardly from said lamination periphery to be disposed either inside or outside of said flux path, respectively, each of said apertures being arranged in one of three groups of apertures, corresponding ones of said apertures of different ones of said laminations of said stack being aligned in series with each other, (c) said lamination members of each of said lamination groups having the first of their said aperture groups including like combinations of apertures inside and outside said flux path, (d) said lamination members of each of said lamination groups having the second of said aperture groups including different combinations of said apertures inside and outside of their said flux paths, each of said second group apertures corresponding to a different one of said marks, (e) said lamination members of each of said lamination groups having the third of said aperture groups including a plurality of apertures equal in number to the number of said columns forming each of said characters, (f) a plurality of input windings individually threading each of said series of said apertures in said first group of said apertures of each of said lamination members of each of said lamination groups, (g) a plurality of read-out windings individually threading each of said series of apertures in said second group of apertures of each of said lamination members of each of said lamination groups, (h) a plurality of strobe windings individually threading each of said series of apertures in said third group of apertures of each of said lamination members of each of said lamination groups, (i) means for passing signals through each of said input windings corresponding to different bits of individual characters of said digital information for selectively magnetically saturating all of said laminations except those members of the lamination group for that character corresponding to said signals, (j) means for coupling said read-out windings to said print heads for separately driving different ones of said styli, and (k) means for successively applying strobe signals to different ones of said strobe windings for transformer coupling said strobe signals to those of said read-out windings threading apertures extending through said lamination openings of unsaturated ones of said laminations.

12. A magnetic system for providing a plurality of groups of output signals in response to input signals representing the bits of a character of digital information, said system comprising (a) a plurality of core structures each corresponding to a different one of said groups of said output signals, each of said core structures defining a magnetic flux path and having three groups of apertures therethrough, (b) the apertures of said first group being disposed inside and outside of said flux path in a pattern which satisfies the code for said character of digital information, (c) each of said core structures having said second group of apertures disposed inside and outside of said flux path according to the presence and absence of output signals in its associated groups of output signals, (d) said third group of apertures including a plurality of apertures equal in number to the number of said groups of output signals, different ones of said last-named apertures being disposed on the inside of said flux path of different ones of said core structures, (e) a plurality of input windings individually threading the apertures of said first group of apertures of all of said core structures, (f) a plurality of read-out windings individually threading said second group of apertures of each of said core structures, (g) a plurality of enabling windings individually threading said third group of apertures of each of said core structures, (h) means for passing signals through each of said input windings corresponding to the bits of characters of digital information in accordance with said code for magnetically saturating all of said core structures except when said signals satisfy the code for said character of digital information, means for successively applying enabling signals for different ones of said enabling windings, and (i) means for deriving said groups of output signals from said read-out windings.

References Cited by the Examiner

UNITED STATES PATENTS

| | | | |
|---|---|---|---|
| 2,734,182 | 2/1956 | Rajchman | 340—347 |
| 3,017,518 | 1/1962 | Hanysz | 340—347 X |
| 3,035,257 | 5/1962 | Kretzmer | 340—347 |
| 3,079,597 | 2/1963 | Wild | 235—155 X |
| 3,081,453 | 3/1963 | Nitzan | 340—347 |
| 3,087,149 | 4/1963 | Malcolm | 340—347 |

ROBERT C. BAILEY, *Primary Examiner.*

MALCOLM A. MORRISON, *Examiner.*